United States Patent
Hu et al.

(10) Patent No.: US 11,518,299 B2
(45) Date of Patent: Dec. 6, 2022

(54) HOLOGRAPHIC PROJECTION SYSTEM AND METHOD FOR A VEHICLE

(71) Applicant: Ford Global Technologies, LLC, Dearborn, MI (US)

(72) Inventors: Heidi Hu, Jiangsu (CN); Amy Zheng, Jiangsu (CN); Ted Wei, Jiangsu (CN); Jim Zhou, Jianghsu (CN); Rocky Lu, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 186 days.

(21) Appl. No.: 17/180,324

(22) Filed: Feb. 19, 2021

(65) Prior Publication Data
US 2021/0268959 A1    Sep. 2, 2021

(30) Foreign Application Priority Data
Feb. 27, 2020   (CN) .......................... 202010123678.4

(51) Int. Cl.
| | |
|---|---|
| *B60Q 1/50* | (2006.01) |
| *B62D 21/17* | (2006.01) |
| *B60Q 1/00* | (2006.01) |
| *G03B 21/608* | (2014.01) |
| *B05B 17/08* | (2006.01) |
| *B05B 15/00* | (2018.01) |
| *B60R 13/00* | (2006.01) |

(52) U.S. Cl.
CPC ................ *B60Q 1/50* (2013.01); *B05B 15/00* (2013.01); *B05B 17/08* (2013.01); *B60Q 1/0017* (2013.01); *B60R 13/005* (2013.01); *B62D 21/17* (2013.01); *G03B 21/608* (2013.01); *B60Q 2400/50* (2013.01)

(58) Field of Classification Search
CPC ......... B05B 1/205; B05B 9/035; B05B 12/12; B05B 15/00; B05B 17/08; B60Q 1/0017; B60Q 1/482; B60Q 1/50; B60Q 2400/40; B60Q 2400/50; B60Q 2900/50; B60R 11/00; B60R 13/005; B60R 16/0231; B60R 2011/004; B62D 21/17; G03B 21/00; G03B 21/608
See application file for complete search history.

(56) References Cited

U.S. PATENT DOCUMENTS

| | | | |
|---|---|---|---|
| 6,580,368 B1 * | 6/2003 | Jacobs | ................... B60Q 1/482 116/28 R |
| 10,284,822 B2 | 5/2019 | Murar et al. | |
| 2014/0204344 A1 | 7/2014 | Harris | |
| 2019/0310486 A1 | 10/2019 | Ferri | |

FOREIGN PATENT DOCUMENTS

EP    3002736 A1    4/2016

* cited by examiner

*Primary Examiner* — Jason M Han
(74) *Attorney, Agent, or Firm* — Frank Lollo; Bejin Bieneman PLC (57) ABSTRACT

A holographic projection system and method are implemented by a projection device provided on the vehicle; a water mist generating device for generating water mist provided on the vehicle; and a controller in communication with the projection device and the water mist generating device. The controller is configured to detect a signal of user proximity to the vehicle, and activate the water mist generating device and the projection device respectively based on the detected signal, so that the projection device projects an image onto the water mist.

20 Claims, 5 Drawing Sheets

HOLOGRAPHIC PROJECTION SYSTEM AND METHOD FOR A VEHICLE

CROSS-REFERENCE TO RELATED APPLICATION

This patent application claims priority to Chinese Application No. CN 2020101236784 filed on Feb. 27, 2020, which is hereby incorporated by reference in its entirety.

BACKGROUND

When a vehicle is parked in a parking lot, the driver of the vehicle usually returns to the parking lot to retrieve their vehicle. However, it is often difficult to find the vehicle, e.g., when it is cloudy, night-time, or in other low light conditions. The vehicle driver usually needs to recall information such as a parking lot area number and parking space number, and in the meantime look for a right route to the vehicle, which often brings confusion and frustration to the vehicle driver.

In addition, existing vehicles have limited personalized and customized features, and lack interaction with vehicle users (such as the driver).

Therefore, there is a need for a system and method that can help vehicle users find their vehicle easily, and that can increase interaction between the vehicle and the users and improve the personalized and customized features of the vehicle in the meantime.

SUMMARY

The present disclosure summarizes aspects of the embodiments and should not be used to limit the claims. Other implementations are contemplated in accordance with the techniques described herein, as will be apparent to those of ordinary skill in the art upon examination of the following drawings and detailed description, and such implementations are intended to be within the scope of this application.

The present disclosure relates to a holographic projection system and method for a vehicle. It has been recognized that there is a need for a holographic projection system and method for a vehicle, which can help vehicle users find their vehicle easily, especially in the case of cloudy, night or other low light conditions.

According to the present disclosure, there is provided a holographic projection system for a vehicle comprising:
 a projection device provided on the vehicle;
 a water mist generating device for generating water mist provided on the vehicle; and
 a controller in communication with the projection device and the water mist generating device, the controller is configured to detect a signal of proximity to the vehicle, and activate the water mist generating device and the projection device respectively based on the detected signal, so that the projection device projects an image onto the water mist.

In one or more examples, the holographic projection system further comprises a water tank connected to the water mist generating device, and the water tank is provided on the vehicle and configured to supply water to the water mist generating device.

In one or more examples, the water tank is connected to a rainwater collection system of the vehicle and/or an air-conditioning system of the vehicle and configured to store rainwater from the rainwater collection system and/or condensate from the air-conditioning system.

In one or more examples, the rainwater collection system comprises:
 a drain hole provided between a windshield and a hood of the vehicle and configured to collect the rainwater; and
 a rainwater collection valve provided between the drain hole and the water tank and configured to automatically close when the rainwater in the water tank reaches a threshold level.

In one or more examples, the air-conditioning system comprises an air-conditioning condensate recovery system provided in an engine compartment of the vehicle, and the air-conditioning condensate recovery system is configured to recycle the condensate generated by the air-conditioning system.

In one or more examples, the projection device is provided on a top of the vehicle, and the water mist generating device comprises at least one water mist sprayer provided on the top adjacent to the projection device.

In one or more examples, the projection device is integrated in a roof antenna of the vehicle, and a plurality of the water mist sprayers are provided on a roof rail of the vehicle.

In one or more examples, the projection device is provided on an exterior rearview mirror of the vehicle, and the water mist generating device is provided on a vehicle body side of the vehicle and includes at least one water mist sprayer.

In one or more examples, the projection device is integrated in the external rearview mirror, and a plurality of the water mist sprayers are provided below a door sill of the vehicle along the vehicle body side.

In one or more examples, the projection device is provided on a top of the vehicle adjacent to a windshield, and the water mist generating device comprises at least one water mist sprayer provided on a front bumper cover along the transverse direction of the vehicle.

In one or more examples, the projection device is provided on a badge of the vehicle, and the water mist generating device comprises at least one water mist sprayer provided on a front bumper cover and above the projection device along the transverse direction of the vehicle.

In one or more examples, the signal of proximity to the vehicle comes from one of the following:
 an on-board camera;
 a portable device; and
 a vehicle key,
 wherein the portable device includes: smart phone key (PAAK), smart phone, mobile phone, personal digital assistant (PDA), MP3, tablet or portable multimedia player (PMP).

In one or more examples, the image comprises: an image of a vehicle badge.

In one or more examples, the image is customizable by an user of the vehicle.

According to the present disclosure, there is provided a vehicle comprising the holographic projection system for the vehicle.

According to the present disclosure, there is provided a holographic projection method for a vehicle comprising:
 detecting a signal of proximity to the vehicle;
 activating a first water mist generating device provided on the vehicle to generate water mist based on the detected signal; and
 activating a first projection device provided on the vehicle to project an image onto the water mist.

In one or more examples, the method further comprises:
activating the first water mist generating device and the first projection device respectively in response to the detected signal being within a first threshold range.

In one or more examples, the first water mist generating device and the first projection device are both provided on a roof of the vehicle.

In one or more examples, the method further comprises:
deactivating the first water mist generating device and the first projection device and activating a second water mist generating device and a second projection device respectively in response to the detected signal being within a second threshold range, wherein, the second threshold range is less than the first threshold range.

In one or more examples, the second projection device is provided on an exterior rearview mirror of the vehicle, and the second water mist generating device is provided on a vehicle body side of the vehicle.

BRIEF DESCRIPTION OF THE DRAWINGS

For a more complete understanding of the present disclosure, reference should be made to the examples illustrated in more detail in the accompanying drawings and described below, in which.

DETAILED DESCRIPTION

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present invention in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

In addition, in this document, relational terms such as first and second are only used to distinguish one entity or action from another entity or action, and do not necessarily require or imply any actual such relationship or sequence between these entities or actions. The terms "comprise", "comprising" or any other variations thereof are intended to cover non-exclusive inclusion, so that a process, method, article or device comprising a series of elements includes not only those elements, but also can include those that are not explicitly listed or inherent in the process, method, article or device.

One or more examples will be described below in conjunction with the drawings. The flowchart describes the process performed by the disclosed system. It can be understood that the execution of the flowchart does not need to be performed in sequence, one or more steps can be omitted, one or more steps can also be added, and one or more steps can be performed in order or in reverse order, and even in some examples, can be performed simultaneously.

The vehicle involved in the following examples may be a standard gasoline-powered vehicle, a hybrid vehicle, an electric vehicle, a fuel cell vehicle, a two-wheeled or three-wheeled vehicle, and/or any other suitable type of vehicle. The vehicle may include components to provide motion, such as an engine, an electric motor, a transmission, a suspension, a drive shaft, and/or wheels. The vehicle may also include components related to vehicle control, such as a vehicle controller or computer, a vehicle communication bus and the like. The vehicle controller may be connected to in-vehicle components through the vehicle bus to realize control of these components. The vehicle can be non-autonomous, semi-autonomous (for example, some regular motion functions are controlled by the vehicle) or autonomous (for example, motion functions are controlled by the vehicle without direct input from the driver).

Figure 1:
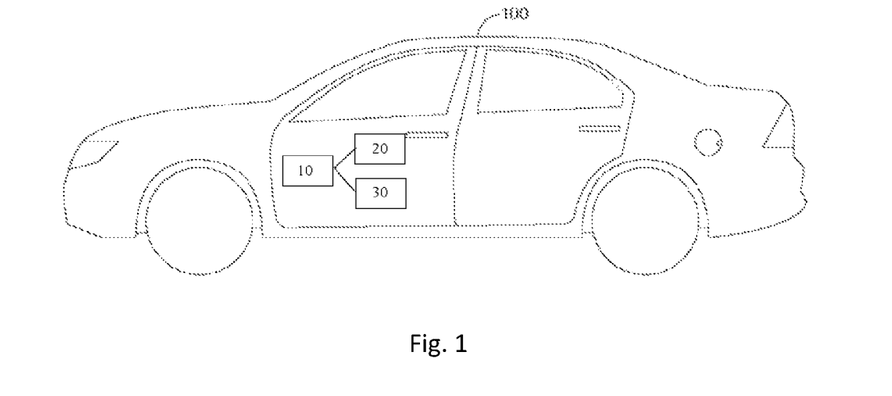
FIG. 1 shows a schematic diagram of a motor vehicle comprising a holographic projection system for a vehicle according to an example.
Figure 2:
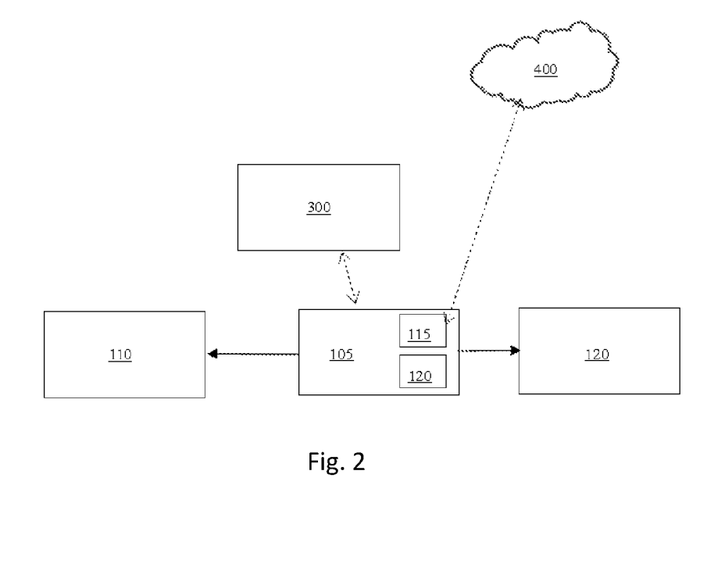
FIG. 2 shows a block diagram of a holographic projection system for a vehicle according to an example.

With reference to FIG. 1 and FIG. 2, a holographic projection system 10 for a vehicle 100 according to an example is provided. The holographic projection system 10 comprises: a projection device 110 provided on the vehicle 100; a water mist generating device 120 for generating water mist provided on the vehicle 100; and a controller 105 in communication with the projection device 110 and the water mist generating device 120. The controller 105 is configured to detect a signal of proximity of a user to the vehicle, and activate the water mist generating device 120 and the projection device 110 respectively based on the detected signal, so that the projection device 110 projects an image onto the water mist.

In some examples, the projection device 110 and the water mist generating device 120 may both be disposed on a top or roof 40 of the vehicle 100. The water mist generating device 120 may include at least one water mist sprayer. The water mist generating device 120 may be located adjacent to the projection device 110, for example, a plurality of the water mist sprayers may be provided around the projection device 110. The projection device 110 may include any suitable projection device known in the art that can use holographic projection technology to project images in the air, including, for example, a water mist projector, a smoke projector, or the like. The water mist generating device 120 may include any device known in the art that can atomize liquid such as water.

Figure 3:
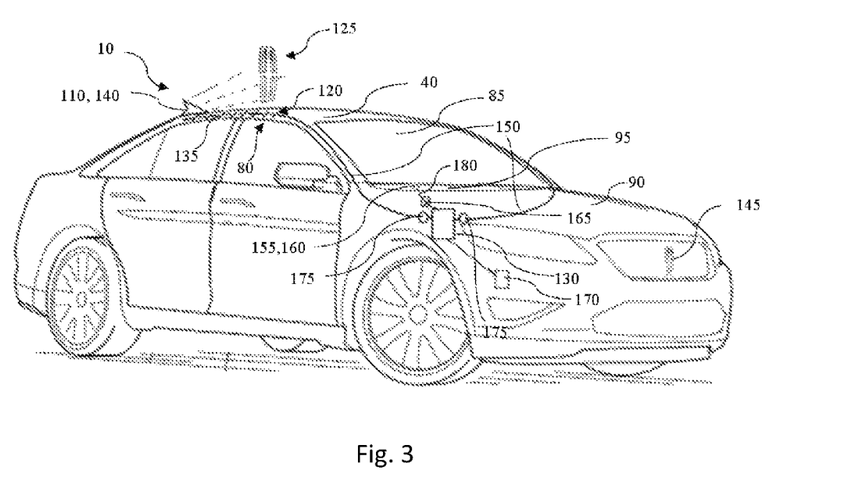
FIG. 3 shows a schematic diagram of a holographic projection system for a vehicle according to an example.

In the example shown in FIG. 3, the projection device 110 may be integrated with a roof antenna 140 and be oriented toward the forward direction of the vehicle 100. The water mist generating device 120 may include a plurality of water mist sprayers 135 which may be provided on a roof rail 80. As shown in the figure, eight water mist sprayers 135 are spaced apart from each other on the roof rail 80 on one side of the vehicle 100. Although only one side of the vehicle 100 is shown in FIG. 3, it is conceivable that the arrangement of the water mist sprayer on the other opposite side of the vehicle 100 may be the same as that on the side shown. Therefore, when the controller 105 activates the water mist generating device 120 and the projection device 110 respectively in response to detecting the signal of a user's proximity to the vehicle, the water mist sprayers 135 on both sides of the roof will spray water mist. A water mist atmosphere, such as a "water mist screen", is thus formed above the roof 40 of the vehicle 100, and the projection device 110 projects an image 125 onto the "water mist screen". As shown, the image 125 may be an image of the badge (also be called "logo") 145 of the vehicle 100. This is advantageous, especially in the case of cloudy, night, and/or other low light conditions, when a vehicle user (such as driver) needs to find their vehicle from numerous vehicles in a parking lot, the image 125 projected onto the top of the roof can prompt the vehicle user of the position of vehicle in an obvious and attractive way, so that the vehicle user can find their vehicle easily.

Those skilled in the art will understand that the drawings are exemplary, and that the specific position and relative arrangement of the projection device 110 and the water mist sprayer 135 can be set according to actual needs and are not limited to embodiment shown or described, and the number of water mist sprayer may also be one or any other number. When the number of water mist sprayer is one, the water mist sprayer may be a high-power sprayer that can be sufficient to create a water mist atmosphere. In addition, although the figure shows that the roof antenna 140 is located at the rear of the roof 40 of the vehicle 100, the vehicle 100 may additionally or alternatively include a roof antenna provided at the front of the roof 40. The projection device 110 may be integrated in the roof antenna located at the front and be oriented toward the reverse direction of the vehicle 100. Additionally, the projection device 100 may also be separately provided on the roof of the vehicle instead of being integrated with the roof antenna 140.

The holographic projection system 10 may further include a water tank 130 for supplying water to the water mist generating device 120 and a water pipe 150 connecting the water tank 130 to the water mist generating device 120. The water tank 130 may be disposed in the vehicle 100 and may be connected to a rainwater collection system 20 of the vehicle 100 and configured to store rainwater from the rainwater collection system 20. Alternatively or additionally, the water tank 130 may be connected to an air-conditioning system 30 of the vehicle 100 and configured to store condensate (or condensed water) from the air-conditioning system 30.

As shown in FIG. 3, the water tank 130 may be provided in an engine compartment of the vehicle 100. The rainwater collection system 20 may include a drain hole 155 provided between a windshield 85 and a hood 90 of the vehicle 100 and configured to collect rainwater. The drain hole 155 may be, for example, a hole directly provided on a recess 95 between the windshield 85 and the hood 90. When it rains, the rainwater will directly fall into the recess 95 and the rainwater on the roof will also fall along the windshield 85 and finally collect in the recess 95. The rainwater falling or collected in the recess 95 will enter a water pipe 180 through the drain hole 155 and finally enter the water tank 130. The rainwater collection system 20 may also include a rainwater collection valve 160 provided between the drain hole 155 and the water tank 130. When the water in the water tank 130 reaches a threshold level (for example, the maximum level), the rainwater collection valve 160 will automatically close to prevent rainwater from flowing into the water tank 130, thereby preventing overflow due to too much water stored in the water tank 130. Optionally, the rainwater collection system 20 may further include a filter 165, which may be disposed between the water tank 130 and the rainwater collection valve 160, so as to filter the rainwater that will enter the water tank 130.

The air-conditioning system 30 may include an air-conditioning condensate recovery system 170 provided in the engine compartment of the vehicle 100. The air-conditioning condensate recovery system 170 may be connected to a condenser (not shown) of the air-conditioning system 30 and configured to recycle the condensate generated by the air-conditioning system 30. Optionally, the air-conditioning system 30 may also include a condensate collection valve (not shown) provided in the water tank 130 and the air-conditioning condensate recovery system 170. When the water in the water tank 130 reaches a threshold level (for example, the maximum level), the condensate collection valve will automatically close, thereby preventing overflow due to too much water stored in the water tank 130.

In addition, the holographic projection system 10 may further include a pump 175 provided between the water mist generating device 120 and the water tank 130. The pump 175 is used to ensure that the water in the water tank 130 is smoothly transported to the water mist generating device 120 through the water pipe 150. In the example shown in FIG. 3, two pumps 175 are shown, but in other examples, only one pump may be provided. One end of the pump may be connected to the water tank 130, and the other end of the pump may be connected to a water pipe. The water pipe may include a plurality of branches respectively connected to the water mist generating device 120. In addition, an additional pump may also be provided between the air-conditioning condensate recovery system 170 and the water tank 130 dependent on the different installation positions of the air-conditioning condensate recovery system 170 and the water tank 130 (for example, in the example shown in FIG. 3, the air-conditioning condensate recovery system 170 is disposed downstream of the water tank 130), to ensure that the condensate in the air-conditioning condensate recovery system 170 is smoothly transported to the water tank 130.

Since the water tank 130 can be connected to the rainwater collection system 20 and/or the air-conditioning system 30 and use one or both of them as the water source, the water mist generating device 120 can operate effectively without the need to provide an additional water source for it. Recycling the condensate generated by the air-conditioning system 30 can also maximize the energy recovery rate of the vehicle and save costs.

It should be understood that although the specific position and relative arrangement of multiple components such as the water tank 130 and the air-conditioning condensate recovery system 170 is shown in FIG. 3, the specific position and relative arrangement of these components can be set according to actual needs and are not limited to the example shown or described. In addition, although FIG. 3 shows that the water tank 130 is connected to both the rainwater collection system 20 and the air-conditioning system 30, the water tank 130 may be connected to only one of the two according to needs.

Figure 4:
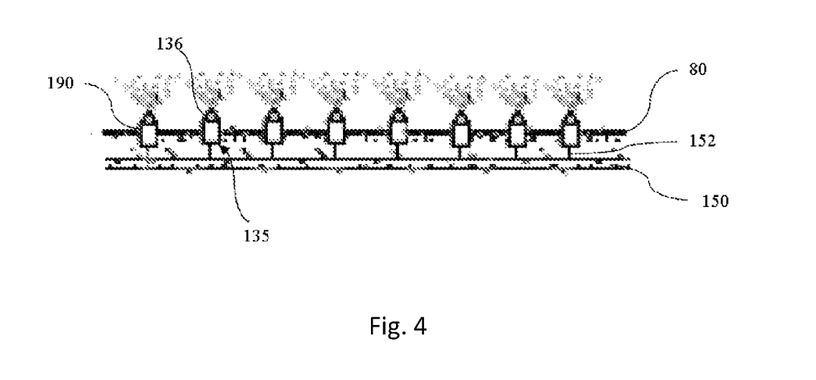
FIG. 4 shows a cross-sectional view of a roof rail of a motor vehicle according to an example.

FIG. 4 shows a cross-sectional view of the roof rail 80. As shown in FIG. 4, the roof rail 80 is provided with at least one hole 190. One or more water mist sprayers 135 are installed to the roof rail 80 through the hole 190. The water mist sprayer 135 may include a spray head or nozzle 136. The direction of the spray head or nozzle 136 may be adjustable so as to be able to be oriented in a desired direction as required. At least a portion of the water pipe 150 may include one or more branches 152 fluidly connected to one or more water mist sprayers 135 to provide liquid source for them. A portion of the water pipe 150 that does not include a branch (not shown) may be fixed on the roof rail 80. Those skilled in the art can understand that the drawings are only shown in an exemplary manner, the shape and relative arrangement of the roof rail 80, the water mist sprayer 135 and the water pipe 150 can be set according to actual needs and are not limited to the example shown or described. The number of water mist sprayer may also be one or any other number. For example, the roof rail 80 may have a hollow tubular structure, and the water pipe 150 may be provided in the hollow tubular structure. One side of the water pipe 150 that is not connected to the water mist sprayer through one or more branches can be supported on the inner wall of the roof rail.

Figure 5:
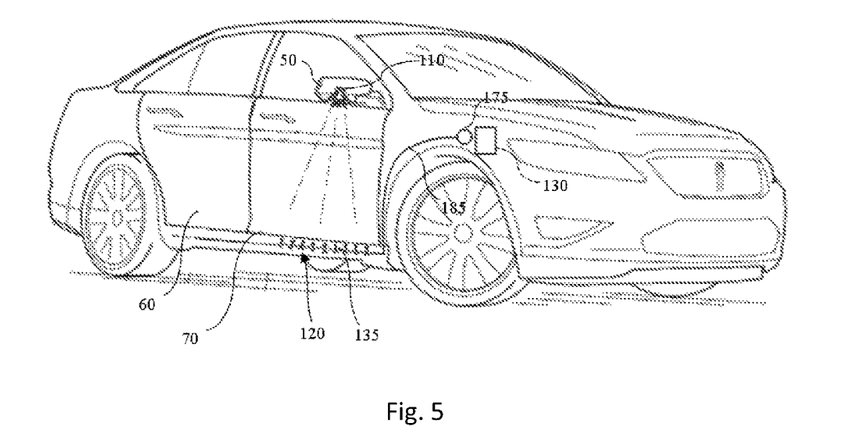
FIG. 5 shows a schematic diagram of a holographic projection system for a vehicle according to an example.

In some examples, the projection device 110 may be disposed on an exterior rearview mirror 50 of the vehicle 100, and the water mist generating device 120 may be disposed on a vehicle body side 60 of the vehicle 100 and includes at least one water mist sprayer 135.

In the example shown in FIG. 5, the projection device 110 may be integrated in the exterior rearview mirror 50, and a plurality of the water mist sprayers 135 may be provided under a door sill 70 of the vehicle 100 along the vehicle body side 60. Although nine water mist sprayers are shown in the figure, one or other number of water mist sprayer are also within the scope of the present disclosure. The water mist generating device 120 may be connected to the water tank 130 through a water pipe 185. Similar to FIG. 3, a pump 175 may be further provided between the water mist generating device 120 and the water tank 130. In addition, the water tank 130 can also be connected to the rainwater collection system 20 and/or the air-conditioning system 30, and the arrangement can be similar to the example shown in FIG. 3, and thus omitted in FIG. 5. And similar to FIG. 4, the vehicle body side 60 may include one or more holes (not shown), through which one or more water mist sprayers 135 may be installed on the vehicle body side 60. The water pipe 185 may also include one or more branches (not shown) connected with the one or more water mist sprayers. In addition, although only one side of the vehicle 100 is shown in FIG. 5, it is conceivable that the arrangement of the water mist sprayer and the projection device on the other opposite side of the vehicle 100 may be the same as that on the side shown. In another example, the projection device 110 and the water mist generating device 120 may be provided only on a driver side of the vehicle 100. When the controller 105 activates the water mist generating device 120 and the projection device 110 respectively in response to detecting the signal of proximity to the vehicle, the water mist sprayer 135 on the vehicle body side 60 of the vehicle 100 will spray water mist. A water mist atmosphere, such as a "water mist screen", is thus formed on the left and/or right side of the vehicle 100. The projection device 110 can project an image (not shown) onto the "water mist screen". According to a setting of the water mist sprayer 135, the image can be suspended in different heights in the air. The image may be an image of the badge 145 of the vehicle 100. Alternatively, the image may be an image of a welcome carpet. In other examples, the image may be customized by an user of the vehicle 100. This is very advantageous. For example, when the vehicle user (such as the driver) approach their vehicle, the generation of a welcome carpet or other patterns customized by the vehicle user according to their personal preferences can significantly improve the satisfaction of the vehicle user and bring an attractive appearance.

Figure 6:
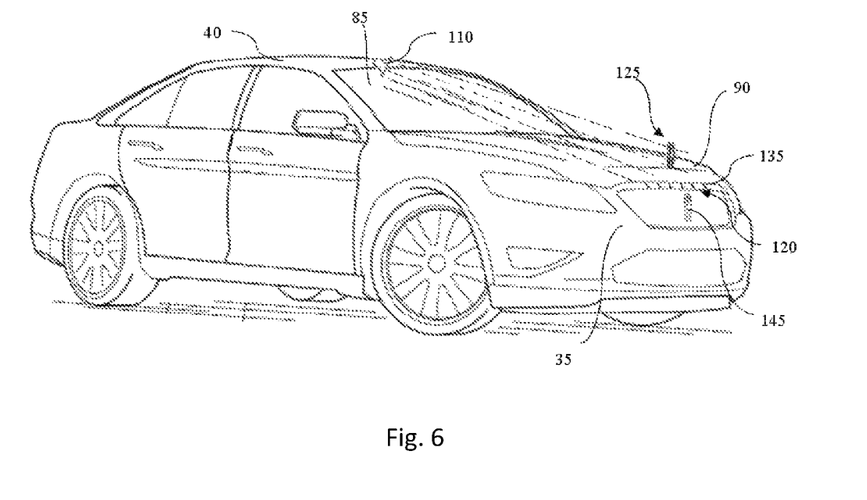
FIG. 6 shows a schematic diagram of a holographic projection system for a vehicle according to an example.

In some examples, the projection device 110 may be provided on the roof 40 of the vehicle 100 adjacent to the windshield 85, and the water mist generating device 120 may include at least one water mist sprayer 135 provided on a front bumper cover 35 along the transverse direction of the vehicle 100.

In the example shown in FIG. 6, the projection device 110 may be provided on the roof 40 of the vehicle 100, for example, at a central position in the front of the roof 40, and oriented toward the forward direction of the vehicle. Five water mist sprayers 135 are disposed on the front bumper cover 35 at certain intervals. Although five water mist sprayers are shown in the figure, one or another number of water mist sprayers are also within the scope of the present disclosure. Except for the different installation positions of the projection device 110 and the water mist generating device 120, the arrangement of the water tank, the rainwater collection device and/or the air-conditioning system, for example, may be similar to that of FIG. 3. In addition, similar to FIG. 4, the front bumper cover 35 may include one or more holes (not shown) through which one or more water mist sprayers 135 may be installed on the front bumper cover 35. A water pipe may also be provided between the water mist generating device 120 and the water tank (not shown). The water pipe may also include one or more branches (not shown) connected to the one or more water mist sprayers 135. When the controller 105 activates the water mist generating device 120 and the projection device 110 respectively in response to detecting the signal of proximity to the vehicle or a signal initiated by the vehicle user, the water mist sprayer 135 on the front bumper cover 35 of the vehicle 100 will spray water mist. A water mist atmosphere, such as a "water mist screen", is thus formed above the hood 90 of the vehicle 100 by adjusting the spray direction of the water mist injector 135. The projection device 110 can project the image 125 onto the "water mist screen". The image 125 may be an image of the badge 145 of the vehicle 100, so that a dynamic badge standing above the hood 90 can be realized. In other examples, the image may be customized by the user of the vehicle 100. This is advantageous. For example, when the vehicle user (such as the driver) approaches or enters their vehicle, the dynamic badge standing above the hood can significantly improve the satisfaction of the vehicle user. The dynamic badge standing above the hood is like a special partner, always accompanying the vehicle user.

Alternatively, the projection device 110 may also be integrated in the front roof antenna and oriented toward the forward direction of the vehicle, so that when the water mist generating device 120 provided on the front bumper cover 35 is activated, the image is projected above the hood 90 of the vehicle 100.

Figure 7:
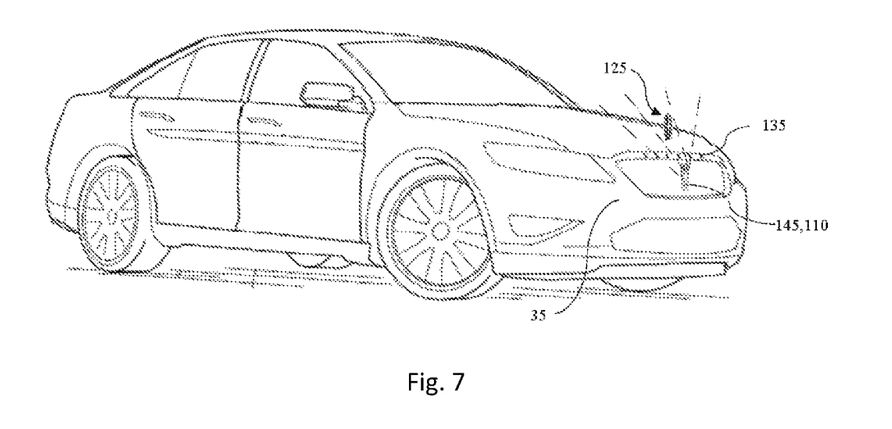
FIG. 7 shows a schematic diagram of a holographic projection system for a vehicle according to an example.

In some examples, the projection device 110 may be provided on the badge 145 of the vehicle 100, and the water mist generating device 120 may include at least one water mist sprayer 135 provided on the front bumper cover 35 and located above the projection device 110 along the transverse direction of the vehicle.

In the example shown in FIG. 7, the projection device 110 can be integrated in the badge 145, and six water mist sprayers 135 can be provided on the front bumper cover 35 at a certain interval and located above the badge 145. Although six water mist sprayers are shown in the figure, one or another number of water mist sprayers are also within the scope of the present disclosure. Except for the different installation positions of the projection device 110 and the water mist generating device 120, the arrangement of other components can be similar to that of FIG. 6, and thus are not repeated here.

Alternatively, the front bumper cover 35 may include an upper part and a lower part. The projection device 110 may be disposed in the lower part, while the water mist generating device 120 may be disposed in the upper part. When the water mist generating device 120 and the projection device 110 are activated, an image can be projected above the hood 90 of the vehicle 100 by adjusting the spraying direction of the water mist generating device 120.

Those skilled in the art can understand that, although the above-mentioned examples give examples of images respectively projected above the roof, the vehicle body side, and the hood of the vehicle by the projection device and the water mist generation device, it is conceivable that the images may be projected above the roof, the vehicle body side, and the hood of the vehicle and different combinations of them according to needed. In addition, the projection device and the water mist generating device according to the present disclosure can also be provided at other position of the vehicle, such as the rear of the vehicle, according to needs, so as to generate a projection image at a desired position.

Referring again to FIG. 2, the controller 105 may communicate with the projection device 110, the mist generating device 130, a portable device 300 and a wide area network 400. The controller 105 may include hardware and software for communication with the projection device 110, the water mist generating device 130, the portable device 300 or a traditional vehicle key, the wide area network 400, and other components on the vehicle 100 (such as an on-board camera, a seat sensor, a Human Machine Interface (HMI), vehicle distance sensor, etc.). For example, the controller 105 may be in communication with the human machine interface. When the user of the vehicle 100 inputs, selects, or customizes the image to be projected through the human machine interface, the information is transmitted and stored in the controller 105, and then the controller 105 transmits the image for projection to the projection device of the present disclosure as required. Alternatively or alternatively, the system 105 may also store images of vehicle badges, welcome carpets, etc.

Figure 8:
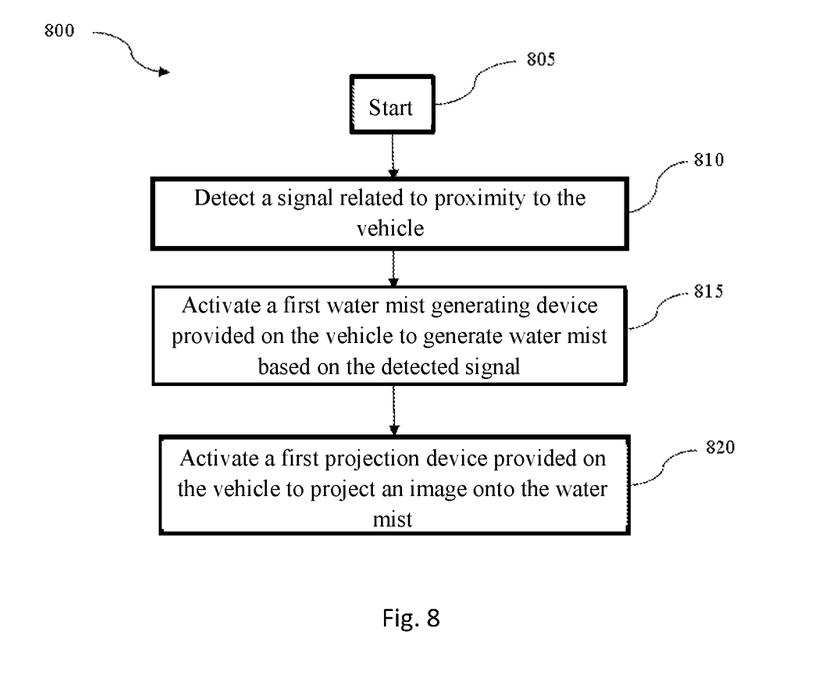
FIG. 8 shows a flowchart of a holographic projection method for a vehicle according to an example.

The system 105 may further include a processor 115 and a memory 120. The memory 120 may store instructions executable by the processor 115. When the instructions are executed by the processor 115, the following steps of a holographic projection method 800 for a vehicle according to the present disclosure can be implemented, as illustrated in FIG. 8: at 810, a signal of proximity to the vehicle is detected; at 815, a first water mist generating device provided on the vehicle 100 is activated to generate water mist based on the detected signal; and at 820, a first projection device provided on the vehicle 100 is activated to project an image onto the water mist.

In some examples, the controller 105 may be a part of a vehicle computing system (VCS) in the vehicle 100, or may be independent of the VCS and connected to the VCS to share part of its functions. As those skilled in the art will understand, a VCS can include processors, memories, positioning devices, communication devices, human machine interfaces, etc., and can communicate with various vehicle components and auxiliary components through a vehicle network (such as but not limited to a Controller Area Network (CAN) bus, Local Interconnect Network (LIN) bus, Media Oriented System Transport (MOST) bus, or Ethernet bus, etc.), to transmit data to or from VCS (or its components). The VCS can also communicate with the wide area network 400 and other information sources using various wireless communication standards or protocols to transfer various information between them. Wireless communication standards or protocols may include cellular communication standards (including Global System For Mobile Communications (GSM) system, Code Division Multiple Access (CDMA) system, and Time Division Multiple Address (TDMA)) System, general mobile telecommunications system, 3G or 4G or 5G system, etc.), IEEE 802.11 standards (802.11b, 802.11g and 802.11n, etc.), Bluetooth standards (Bluetooth and/or Bluetooth low energy, etc.), Dedicated Short Range Communications (DSRC) and so on.

In some examples, the signal of proximity to the vehicle may come from one of an on-board camera (not shown), the portable device 300, and a vehicle key (not shown).

The on-board camera may be provided on the vehicle 100, for example, on the roof, so as to detect the situation around the vehicle 100 in real time and capture images around the vehicle 100. In a non-limiting example of the present disclosure, the on-board camera may communicate with the controller 105, and the controller 105 may store images of the user (for example, the driver) of the vehicle 100 in advance. When the on-board cameras capture an image of a person in a certain range around the vehicle 100, the captured image is transmitted to the controller 105, and the controller 105 can compare the received image with the stored image. If the comparison result shows that the captured person is the user of the vehicle 100, the controller 105 will further execute other steps of the holographic projection method 800 for a vehicle according to the present disclosure, as described in other parts of the present disclosure.

The portable device 300 may at least include: a smart phone key (PAAK), a smart phone, a mobile phone, a personal digital assistant (PDA), an MP3, a tablet computer, or a portable multimedia player (PMP). In a non-limiting example of the present disclosure, the portable device 300 may be carried by the user of the vehicle 100, and the controller 105 may detect a signal from the portable device 300. In addition, when the user of the vehicle 100 presses a button on the portable device 300 and/or activates an application on it, the signal may also be generated. When the controller 105 detects the signal from the portable device 300, the controller 105 will further execute other steps of the holographic projection method 800 for a vehicle according to the present disclosure, as described in other parts of the present disclosure.

Figure 9:
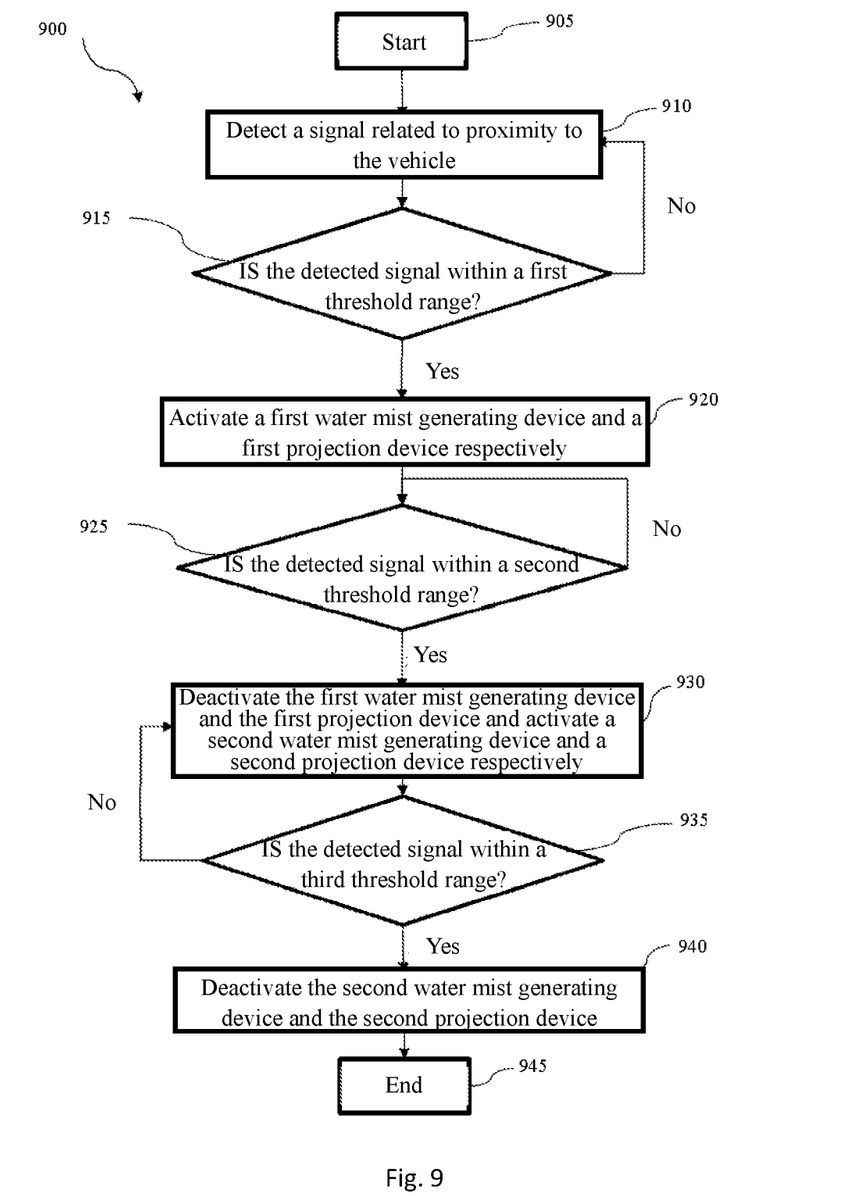
FIG. 9 shows a flowchart of a holographic projection method for a vehicle according to an example.

FIG. 9, shows a flowchart of a non-limiting example of a holographic projection method 900 for a vehicle 100 according to the present disclosure. The method 900 starts at block 905. In one example, the method 900 may be initiated in response to the vehicle shutting down. For example, a vehicle user turns off the ignition switch of the vehicle 100 and parks the vehicle 100 in a parking lot. Alternatively or additionally, the method 900 may be initiated in response to a vehicle user (e.g., the driver) initiating, for example, in response to the driver pressing a vehicle shut down button provided on the vehicle, a voice command or a gesture of the driver.

Next, at block 910, a signal of proximity to the vehicle is detected. In some examples, the controller 105 may detect the signal at regular intervals (for example, every twenty seconds). When an user of a vehicle 100 carrying, for example, a smart phone key (PAAK) enters the parking lot where the vehicle 100 is located and is within a certain range from the vehicle 100, the controller 105 may detect the signal from the smart phone key (PAAK).

Then, at block 915, it can be determined whether the detected signal is within a first threshold range. In an example, the determination can be made based on whether the controller 105 detects that the signal from the smart phone key (PAAK) is within the first threshold range from the vehicle 100. The first threshold range may be about 5-10 meters, or greater than 10 meters, for example. The first threshold range can be obtained based on experience and stored in the vehicle system in advance according to needs. In an example, the first threshold range may be based on the maximum communication range of the portable device 300 such as a smart phone key (PAAK). Alternatively, the first threshold range may be obtained through machine learning. If the detected signal is within the first threshold range, the method 900 proceeds to block 920; otherwise, the method 900 returns to block 910.

At block 920, a first water mist generating device and a first projection device are respectively activated. In a non-limiting example of the present disclosure, the first water mist generating device and the first projection device may both be provided on a roof of the vehicle 100. For example, the first water mist generating device may include the water mist generating device described with reference to FIG. 3, and the first projection device may include the projection device described with reference to FIG. 3. Alternatively, the first water mist generating device and the first projection device may be activated in response to instructions from the user of the vehicle 100, for example, pressing a button on the portable device 300 and/or activating an application thereon. After the first water mist generating device and the first projection device are respectively activated, the user of the vehicle 100 can quickly and accurately find the location of their vehicle 100 and gradually approach the vehicle 100.

As the user of the vehicle 100 further approaches the vehicle 100, the method 900 may further comprises determining that whether the detected signal is within a second threshold range, as shown in block 925. In one example, the determination can be made based on whether the controller 105 detects that the signal from the smart phone key (PAAK) is within the second threshold range from the vehicle 100. The second threshold range may be smaller than the aforementioned first threshold range, and the second threshold range may be, for example, about 1-5 meters. The second threshold range can be obtained based on experience and stored in the vehicle system in advance according to needs. In one example, the second threshold range can be obtained through machine learning. If the detected signal is within the second threshold range, the method 900 proceeds to block 930; otherwise, the method 900 may continue to determine that whether the detected signal is within the second threshold range.

At block 930, the first water mist generating device and the first projection device are deactivated and a second water mist generating device and a second projection device are activated, respectively. In a non-limiting example of the present disclosure, the second water mist generating device may be provided on the vehicle body side 60 of the vehicle 100, and the second projection device may be provided on the exterior rearview mirror of the vehicle 100. For example, the second water mist generating device may include the water mist generating device described with reference to FIG. 5, and the second projection device may include the projection device described with reference to FIG. 5. When the user of the vehicle 100 are very close to the vehicle 100, for example, the distance to the vehicle 100 is about 1.5 meters, the first water mist generating device and the first projection device can be deactivated, and at the same time, or immediately after that, the second water mist generation device and the second projection device is activated, to project a pattern such as a welcome carpet on the left and/or right side (for example, the driver's door side or the passenger's door side) of the vehicle 100 to welcome the user of the vehicle 100 in a unique and attractive manner. In a non-limiting example of the present disclosure, the method 900 may further include using a distance sensor or other sensors provided on the vehicle 100 to detect the proximity of the vehicle user to the vehicle. For example, the distance sensor can be installed on the doors on both sides of the vehicle. When the user's approach is only detected on the driver's door side and not on the passenger's door side, only the projection device and water mist generation device on the driver's door side can be activated.

As the user of the vehicle 100 further approaches the vehicle 100, the method 900 may further comprises determining that whether the detected signal is within a third threshold range, as shown in block 935. For example, the determination can be made based on whether the controller 105 detects that the signal from the smart phone key (PAAK) is within the third threshold range from the vehicle 100. The third threshold range may be smaller than the aforementioned second threshold range. The third threshold range may be, for example, about 0.5-1 meters. The third threshold range can be obtained based on experience and stored in the vehicle system in advance according to needs. In one example, the third threshold range can be obtained through machine learning. If the detected signal is within the third threshold range, the method 900 proceeds to block 940; otherwise, the method 900 may comprise maintaining the deactivation of the first water mist generating device and the first projection device, and maintaining the activation of the second water mist generating device and the second water mist generating device. For example, the method 900 may return to block 930.

At block 940, the second water mist generating device and the second projection device are deactivated. In a non-limiting example of the present disclosure, when the user of the vehicle 100 is about 0.5 meter away from the vehicle 100, the second water mist generating device and the second projection device are deactivated to prevent the water mist sprayed from the water mist generating device 120 from wetting the user of the vehicle 100. Then, the method 900 can end. Alternatively or additionally, the method 900 may end in response to an instruction from the vehicle user (e.g., the driver), for example, pressing a button on the portable device 300 and/or activating an application thereon.

Alternatively, the method 900 may further include the step of activating a third water mist generating device and a third projection device during the user of the vehicle 100 approaches the vehicle 100 and/or after the user of the vehicle 100 enters the vehicle 100 and sits on the seat. In a non-limiting example, the third projection device may be disposed on the top of the vehicle 100 adjacent to the windshield, and the third water mist generating device may be disposed on the front bumper cover. For example, the third water mist generating device may include the water mist generating device described with reference to FIG. 6, and the third projection device may include the projection device described with reference to FIG. 6. Alternatively, the third projection device may be provided on the badge of the vehicle 100, and the third water mist generating device may be provided on the front bumper cover and located above the third projection device. For example, the third water mist generating device may include the water mist generating device described with reference to FIG. 7, and the third projection device may include the projection device described with reference to FIG. 7. When the user of the vehicle 100 is very close to the vehicle 100 (for example, the distance to the vehicle 100 is about 1.5 meters) and/or enters the vehicle 100 and sits on the seat, the third water mist generating device and the third projection device can be activated, so as to project an image above the hood 90 of the vehicle 100. Alternatively or additionally, the third water mist generating device and the third projection device may be activated in response to an instruction from the vehicle user.

Those skilled in the art can understand that, although the above examples are described with the water mist generating device 120, other devices that can be used with a projection device and use holographic projection technology to project images in the air are also included in the scope of the present disclosure. For example, generating a smoke atmosphere by a smoke generating device, and projecting an image in the smoke atmosphere by a projection device is also included in the scope of the present disclosure. In such an example, dry ice, for example, may be used as a raw material to generate smoke. The smoke generating device may be provided at different positions on the vehicle 100 relative to the projection device similar to the water mist generating device, so as to project the image above the top of the vehicle 100, the vehicle body side, the hood, or other desired positions.

According to another aspect of the present disclosure, a vehicle 100 is also provided, as shown in FIG. 1. The vehicle 100 may at least include the holographic projection system 10 for a vehicle according to the present disclosure.

It should be understood that all the examples, features, and advantages described above for the holographic projection system 10 for a vehicle according to the present disclosure are equally applicable to the vehicle 100 according to the present disclosure In the case of no conflict with each other. That is to say, all the examples and variations of the holographic projection system 10 for a vehicle described above can be directly transferred and applied to the vehicle 100 according to the present disclosure, and directly combined here, for the sake of brevity of the present disclosure, will not be repeated it here.

In summary, compared with the prior art, the present disclosure proposes a holographic projection system and method for a vehicle. The holographic projection system and method for a vehicle according to the present disclosure can help a vehicle user to find their vehicle easily, especially in the case of clouds, night, and/or other low light conditions, and can increase interaction between the vehicle user and the vehicle.

Where it is technically possible, the technical features listed in relation to different embodiments can be combined with each other to form further embodiments within the scope of the present invention.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present invention and are given only for the purpose of enabling those skilled in the art to clearly understand the principles of the invention. It should be understood by those skilled in the art that the above discussion to any embodiment is only illustrative, and is not intended to imply that the disclosed scope of the examples (including claims) is limited to these examples; under the overall concept of the invention, the technical features in the above embodiments or different embodiments can be combined with each other to produce many other changes in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

The invention claimed is:

1. A system for a vehicle comprising:
   a projection device;
   a water mist generating device; and
   a controller in communication with the projection device and the water mist generating device, wherein the controller is configured to detect a signal of user proximity to the vehicle, and to activate the water mist generating device and the projection device based on the detected signal such that the projection device projects an image onto the water mist.

2. The system of claim 1, further comprising a water tank connected to the water mist generating device and configured to supply water to the water mist generating device.

3. The system of claim 2, wherein the water tank is connected to at least one of a rainwater collection system of the vehicle or an air-conditioning system of the vehicle, and is configured to store rainwater from at least one of the rainwater collection system or condensate from the air-conditioning system.

4. The system of claim 3, wherein the rainwater collection system includes:
   a drain hole provided between a windshield and a hood of the vehicle to collect the rainwater; and
   a rainwater collection valve provided between the drain hole and the water tank and configured to automatically close when the rainwater in the water tank reaches a threshold level.

5. The system of claim 3, wherein the air-conditioning system comprises an air-conditioning condensate recovery system provided in an engine compartment of the vehicle, and the air-conditioning condensate recovery system is configured to recycle the condensate generated by the air-conditioning system.

6. The system of claim 1, wherein the projection device is provided on a roof of the vehicle, and the water mist generating device includes at least one water mist sprayer provided on the roof adjacent to the projection device.

7. The system of claim 6, wherein the projection device is integrated into a roof antenna of the vehicle, and a plurality of the water mist sprayers are provided on a roof rail of the vehicle.

8. The system of claim 1, wherein the projection device is provided on an exterior rearview mirror of the vehicle, and the water mist generating device is provided on a vehicle body side of the vehicle and includes at least one water mist sprayer.

9. The system of claim 8, wherein the projection device is integrated in the external rearview mirror, and a plurality of the water mist sprayers are provided below a door sill of the vehicle along a vehicle body side.

10. The system of claim 1, wherein the projection device is provided on a top of the vehicle adjacent to a windshield, and the water mist generating device comprises at least one water mist sprayer provided on a front bumper cover along a transverse direction of the vehicle.

11. The system of claim 1, wherein the projection device is provided on a badge of the vehicle, and the water mist generating device comprises at least one water mist sprayer provided on a front bumper cover and above the projection device along a transverse direction of the vehicle.

12. The system of claim 1, wherein the signal of user proximity to the vehicle comes from one of the following:
an on-board camera;
a portable device; and
a vehicle key,
wherein the portable device includes at least one of a portable key (PAAK), smart phone, mobile phone, a personal digital assistant (PDA), an MP3, a tablet, or a portable multimedia player.

13. The system of claim 1, wherein the image includes an image of a vehicle badge.

14. The system of claim 1, wherein the image is customizable by a user of the vehicle.

15. The system of claim 1, further comprising the vehicle.

16. A method for a vehicle comprising:
detecting a signal of user proximity to the vehicle;
activating a first water mist generating device provided on the vehicle to generate water mist based on the detected signal; and
activating a first projection device provided on the vehicle to project an image onto the water mist.

17. The method of claim 16, further comprising:
activating the first water mist generating device and the first projection device respectively in response to the detected signal being within a first threshold range.

18. The method of claim 17, wherein the first water mist generating device and the first projection device are both provided on a roof of the vehicle.

19. The method of claim 17, further comprising:
deactivating the first water mist generating device and the first projection device; and
activating a second water mist generating device and a second projection device respectively in response to the detected signal being within a second threshold range, wherein, the second threshold range is less than the first threshold range.

20. The method of claim 19, wherein the second projection device is provided on an exterior rearview mirror of the vehicle, and the second water mist generating device is provided on a vehicle body side of the vehicle.

* * * * *